United States Patent
McCormack et al.

(10) Patent No.: US 6,735,297 B1
(45) Date of Patent: May 11, 2004

(54) SYSTEM FOR MAINTAINING PBX LICENSE KEY INFORMATION IN THE EVENT OF A HARDWARE FAILURE REDUCING MTTR

(75) Inventors: Michael S. McCormack, Gloucester, MA (US); Paul Dryer, Andover, MA (US)

(73) Assignee: 3Com Corporation, Santa Clara, CA (US)

( * ) Notice: Subject to any disclaimer, the term of this patent is extended or adjusted under 35 U.S.C. 154(b) by 567 days.

(21) Appl. No.: 09/760,520

(22) Filed: Jan. 12, 2001

(51) Int. Cl.[7] .......................... H04M 7/00; G06F 17/60; H04K 1/00
(52) U.S. Cl. ..................................... 379/221.06; 705/59
(58) Field of Search ...................... 379/221.03, 201.05, 379/279, 200, 93.14, 221.06, 219; 705/59; 711/115

(56) References Cited

U.S. PATENT DOCUMENTS

| | | | | |
|---|---|---|---|---|
| 4,928,304 A | * | 5/1990 | Sakai | ....................... 379/93.14 |
| 6,411,941 B1 | * | 6/2002 | Mullor et al. | .................. 705/59 |
| 2002/0191764 A1 | * | 12/2002 | Hori et al. | ................... 379/200 |

* cited by examiner

Primary Examiner—Benny Tieu
(74) Attorney, Agent, or Firm—McGlew and Tuttle, P.C.

(57) ABSTRACT

A programmable telephone system including system software and system hardware. The system software includes instructions for operating the telephone system, and requires license information to operate. The system hardware includes a system specific memory and a system board. The system board executes the instructions of the system software. The system specific memory store is the license information and is separately replaceable from the system board in the system hardware.

18 Claims, 5 Drawing Sheets

SYSTEM FOR MAINTAINING PBX LICENSE KEY INFORMATION IN THE EVENT OF A HARDWARE FAILURE REDUCING MTTR

FIELD OF THE INVENTION

The present invention relates in general to reducing the Mean Time To Repair (MTTR) in programmable systems having both hardware and software portions. The present invention relates in particular to programmable systems where the software is used under a license agreement and requires license information before operating in a basic mode and/or operating optional features.

BACKGROUND OF THE INVENTION

Programmable systems are becoming larger, more complicated and more versatile, in particular with regard to internal telephone systems for companies and organizations. These internal telephone systems are also known as Private Branch Exchanges (PBX) and are performing more functions, such as voice mail, call forwarding, email, call tracking and billing. This has become possible through the use hardware that can be controlled by software. The hardware performs relatively small, but numerous, and almost generic individual operations under the control of the software. As more features are added, the software in such PBX's is becoming larger, more complicated and more valuable.

Very often a PBX system will be offered for sale with a plurality of different options or additional features for different prices. These different options or additional features are usually enabled either by adding additional software or enabling previously disabled portions of the core software. The costs of generating and testing software can be high for complicated features resulting in high sale prices. The high sale prices in combination with the desirability of additional features, and the fact that software is very easily copied and transferred, results in unauthorized software use and the loss of profits.

One way in which unauthorized software use is controlled is through the use of license information. The software requires that license information be provided before the software can operate. Very often before the software can begin, or additional features can be used, the license information needs to be provided from a source external to the software. The software can ask the operator for the license information each time the license information is required. The license information can also be stored in the hardware that operates the software.

Because the security provided by the license information is desired to be very high, the license information is usually very lengthy and complicated. Having the operator enter the license information each time the license information is required, is very annoying on the part of the operator. Therefore storing the license information in the hardware operating the software is more desirable. The license information is entered by the operator when the PBX system is installed, and additional license information is added whenever additional options or features are added to the system.

A disadvantage of storing license information in the hardware operating the software, is that when the hardware needs to be repaired or replaced, the license information in the hardware is lost. Since the license information is usually only added to the system at the installation of the system or options, paper records of the license information is often lost or unavailable to the operator when a repair or replacement of the hardware occurs. Repairs to hardware are often requiring more time to obtain the license information, especially license information for any upgrades of optional features, than the time to perform the actual physical repair.

SUMMARY AND OBJECTS OF THE INVENTION

It is a primary object of the present invention to reduce the repair time in a programmable system requiring license information, especially a programmable telephone system.

The present invention accomplishes this object by providing a system specific memory for storing the license information. This system specific memory unit is arranged in a stable portion of the programmable system that is separate from a majority of other replaceable system hardware, especially the hardware that operates or runs the system software. The system specific memory is designed to have high reliability, usually a higher reliability than many other of the components of the programmable system. Also the entire stable portion of the programmable system that includes the system specific memory is designed for high reliability. In this way, the portion including the system specific memory will not need to be often replaced and when other hardware of the system needs to be replaced, the license information does not need to be re-entered.

The present invention is economically practical because many types of memory have a high reliability, and a relatively low cost. While it is often desirable from a manufacturing viewpoint to combine as many components as possible into one unit or module, the present invention has found it advantageous to separate a portion of the hardware storing the license information from the remaining hardware, and to have the memory storing the license information to be of high reliability and to be stable.

When a programmable system, such as a PBX, is designed, a system board is provided for operating or running the software. In order to operate the software, the system board contains a main memory which contains both the actual software code and other information concerning the system and/or the specific system board, such as the serial number of the system board, the manufacturing date and information concerning revisions to the system board. While it would be convenient to include license information in this memory, the present invention specifically arranges license information in a separate memory on a unit or module which is separately replaceable from the system board and has a higher reliability than the system board. The system board is generally more complicated than a memory unit because it has more active components and many of these components are inherently less reliable than a memory component. It is therefore possible to provide a separate memory component for the license information which is more reliable than the system board and where the system board is separately replaceable, while still providing a system that is economically practical.

The actual memory component can be any device which has a higher reliability than the system board and where the system board is separately replaceable, preferably in the field, from the memory component. One embodiment of the system specific memory could be a memory Integrated Circuit (IC) such as an Electrically Erasable Programmable Read Only Memory (EEPROM). The EEPROM could be mounted on a Printed Circuit Board (PCB) of the system that only includes inherently stable components. A preferred PCB for the EEPROM would be a disk interface PCB for a main memory unit, such as a disk drive tray of the system.

If the system or main processor board needed to be replaced, this could be performed without replacing the disk drive tray. Another possibility would be that the system specific memory is on a separate board or card which plugs into either the main system processor board, or a connection strip/plane that connects the individual units or modules of the telephone system. A still further possibility for the system specific memory is a memory chip which plugs into a socket mounted so that it is repetitively removable from whatever support structure it is connected to, if that support structure needs to be replaced. The socket holds the memory chip by a biasing clamping action, preferably on the electronic leads of the memory chip. When the supporting structure needs to the replaced, the memory chip is pulled or pried from the defective board and then inserted into the replacement board. The system specific memory in all of the possibilities is preferably non-volatile.

The system specific memory can also be used to store custom settings of the telephone system, such as the names of the individual users, their extension numbers, etc.

By providing non-volatile storage in a portion that does not normally get replaced, the present invention has significantly decreased the "mean time to repair" (MTTF) of the system. Upon system startup, the software of the present invention reads the contents of the system specific memory and enables/configures the telephone system according to the license information and custom settings in the system specific memory.

In many cases, the types and amount of optional software that a customer orders increases over time. When a customer initially purchases a telephone system, the number of users may be low, the need for special features be nonexistent or low, and the money available to purchase a telephone system may also be low. As time progresses, the number of users may increase, the customer's situation may change and additional features are desired, and additional money may become available to add additional features. During the installation, license information is provided for the initial configuration. As additional features and options are added, additional or replacement license information is provided for the new features or options. If the current license information stored in the system is lost, such as due to a system processor board replacement, finding the proper license information in a customer's or vendors personal records can be very time-consuming, especially when the license information has changed due to upgrades or additional features being added. Often the time required to find the proper license information is measured in days, while the actual physical hardware replacement is measured in hours.

The separately replaceable system specific memory of the present invention with its high reliability address this problem. In the present invention, a failure of a main processor board or other similar system module would not require replacement of memory containing license information. The defective unit would be removed and a replacement unit would be installed. Upon re-starting of the system, the license information would be read by the software from the original system specific memory, even if the software and the hardware running the software were replaced. The re-started system would then be re-initialized to its original configuration eliminating the need to re-load the correct license information and other custom settings.

The "mean time to repair" (MTTR) is a key factor in telephone system reliability and availability metrics. The present invention provides for rapid replacement of a system component and return of the system into operation. Many companies and organizations are highly dependent on telephone communication, and work productivity significantly decreases when a telephone system is not operational. Decreasing the "mean time to repair" increases the desirability of a telephone system in many applications, and the present invention is therefore an improvement in programmable telephone systems.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENT

Figure 1:
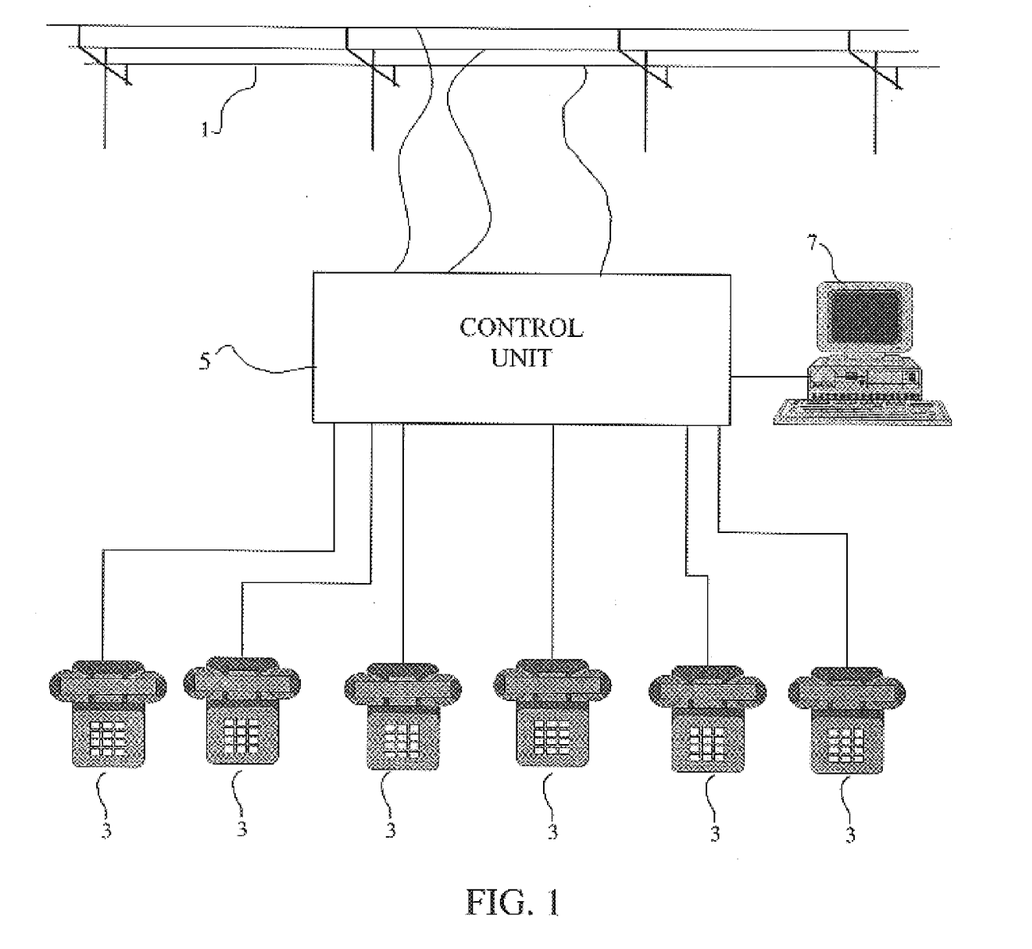
FIG. 1 is an overall schematic view of a telephone system.

Referring to the drawings, and in particular to FIG. 1, the present invention is a telephone system which connects to an external telephone complex 1 such as a Public Switched Telephone Network (PSTN). A plurality of individual phones 3 are connected to a control unit 5. The control unit 5 controls how the individual phones 3 communicate with the external telephone complex 1, and how the individual phones 3 communicate between themselves. A system workstation 7 allows an operator to program the control unit 5 and monitor the status of the control unit 5.

Figure 2:
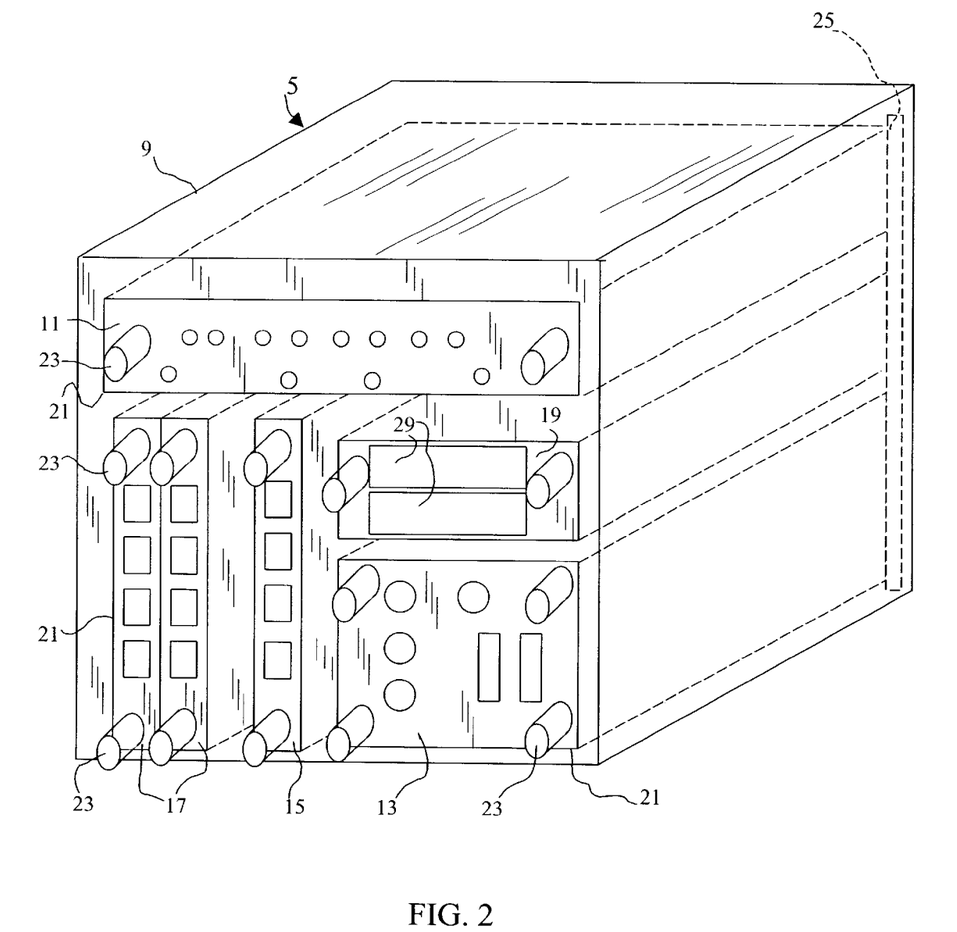
FIG. 2 is a perspective view of a chassis housing various system modules such as a main processor system board, a power supply, interface boards and a main memory unit.
Figure 7:
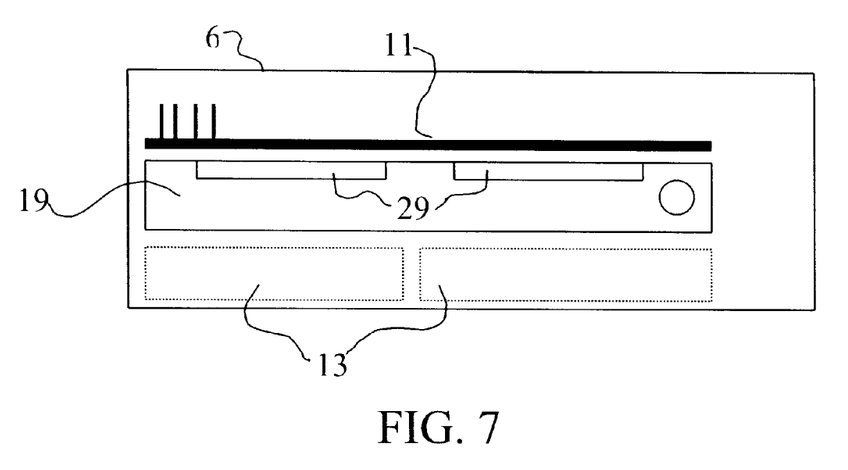
FIG. 7 is a perspective view of a second embodiment chassis housing with various system modules such as a main processor system board, a power supply, and a main memory unit.

As shown in FIG. 2, the control unit 5 is preferably embodied as a chassis 9 which houses a plurality of units or modules. One of the units or modules is a system or main processor board 11 which is the hardware that operates the software and provides other functions for the control unit. Also housed in the chassis 9 is one or more power supply units 13, an external telephone complex interface 15, local branch network interfaces 17, and a main memory unit 19. It is also possible in another embodiment to have the external telephone complex interface 15 and the local branch network interfaces 17 in a separate chassis, such as a gateway chassis, not shown, and to have the main processor board 11, the main memory unit 19, and the power supplies 13 in a control unit chassis 6 as shown in FIG. 7.

In the embodiment of FIG. 2, all of these units or modules fit into slots 21 in the chassis 9. The individual units or modules are separately replaceable in the chassis 9, especially the main memory unit 19. Each of the units can have a handle 23 for ease in replacing the respective unit or module and also for fastening the modules to the chassis 9.

Each of the units preferably connects to a connection strip or system backplane so that the individual units are in electrical contact with each other. The chassis 9 provides the physical connections between modules, and the connection strip 25 provides the electrical connections between the modules. The connection strip 25 preferably clamps onto electrical contact surfaces 27 of the individual modules when the modules are slid into the slots 21 and fastened to the chassis 9.

Figure 4:
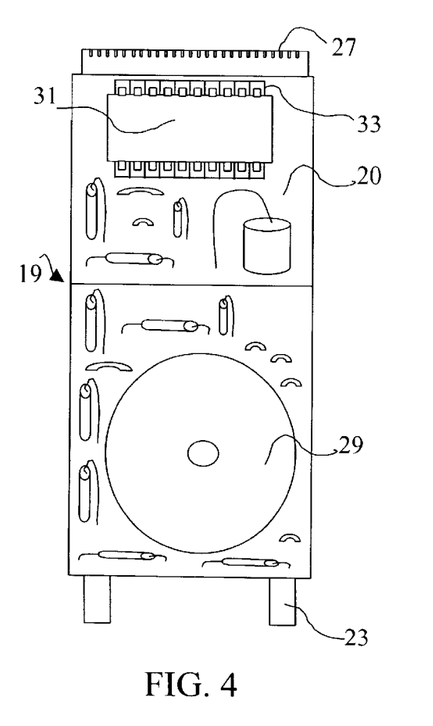
FIG. 4 is a view of a main memory unit.

The main memory unit 19 preferably includes one or more rotating disk drives 29, using either removable media such as floppy disks, optical disks, or tapes, or non-removal media such as a hard drive or memory integrated circuits (IC). Memory integrated circuits units, such as EEPROMS are very reliable and are preferred for the system specific memory 31 which stores the licensing information. The number of individual electrical components needed in such memory units is low, reducing the possibility of failure, and the type of components needed are inherently reliable.

The main memory unit 19 includes a disk interface PCB 20 for controlling the rotating disk drives. The disk interface PCB 20 includes, inter alia, data and power interfaces for the disk drives 29, and a card edge connector interface to attach to the system backplane 25. The system specific memory 31 is preferably located on the disk interface PCB 20. The disk interface PCB 20 can then be designed to have no other active electronic components other than the EEPROM for the system specific memory, making the disk interface PCB the most reliable component in the system. If a disk drive 29 should fail it can be unscrewed and replaced independent of the main memory unit 19. The system specific memory 31 is thus separate from the system board 11 in a separate module and electrically connected by the connection strip or backplane 25. Therefore the module holding the system specific memory 31 is more reliable, or has a higher "Mean Time Between Failures" (MTBF) than other modules or units such as the system board 11 which has more components with some of those components being inherently less reliable.

Figure 3:
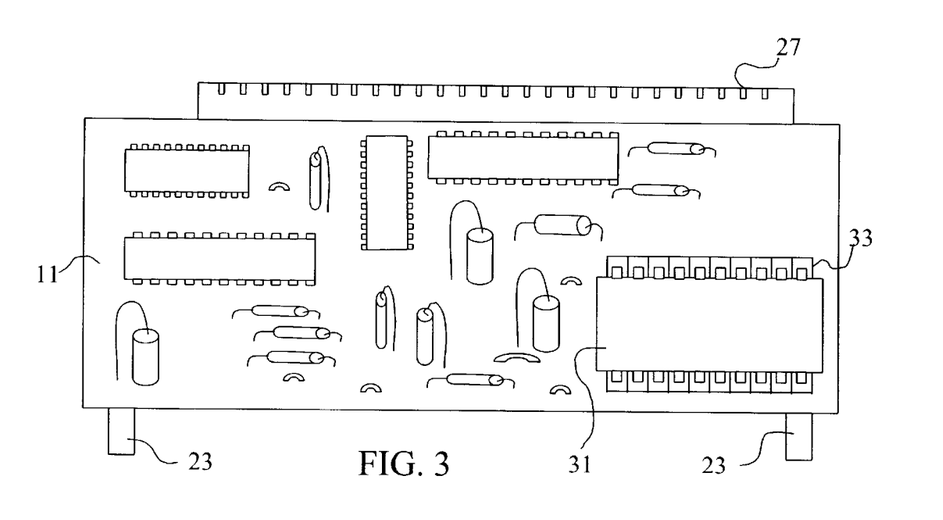
FIG. 3 is a view of a main processor system board.
Figure 5:
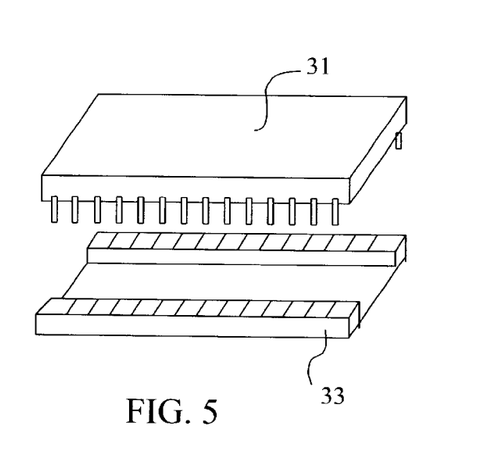
FIG. 5 is an exploded view of a system specific memory formed as a plug and receivable by a socket.

If the system specific memory unit 31 is formed from memory ICs, the memory ICs can be received in a socket 33. This socket 33 can also be positioned anywhere in the chassis 9. It can be arranged on a main memory unit or module 19 as shown in FIG. 4. In another preferred embodiment, the system specific memory 31 and socket 33 can be placed directly on the system board 11 as shown in FIG. 3. In this embodiment, the system specific memory 31 must be pulled or pried from the socket 33 when the defective system board 11 is removed. The removed system specific memory IC is then inserted into the socket 33 of the new or replacement system board 11. This embodiment is advantageous when skilled personnel are performing the replacement. If relatively unskilled operators are to perform the replacement, the separate system specific memory 31 in the main memory unit 19 is preferred.

The individual components of the modules are connected to each other by component connections, usually solder type connections. These solder type connections are known as being substantially permanent and not generally replaceable in the field. Solder connections are usually only replaceable in special facilities such as in a repair facility or factory. If a solder connection needs to be disconnected, it is often more economically practical to replace the entire circuit board.

A module connection connects the system specific memory unit 19 to the chassis 9, the connection strip 25, or other modules. The module connection is preferably a slide in connection where a blade is slid between two fingers which are biased towards the blade. This type of connection is considered to be field replaceable and is easier to replace than a solder connection. Any type of connection can be used for the component connection and the module connection in the present invention as long as the module connection is easier to replace than the component connection.

The present invention is particularly advantageous for license arrangements where each system is assigned a unique system number for that installation and an encryption code which corresponds to the unique system number. The encryption code is created to only work with a specific unique system number which is assigned to a specific system. The unique system number can be set by the manufacture in the factory and the encryption code given to the customer for initialization of the system. Each unique system number can have a plurality of encryption codes corresponding to different levels of operation of the software. By having the license information include a unique system number and specific encryption codes for that unique system number, customers cannot use an encryption code from one system to illegally use software on another system. Examples of unique system numbers can be the serial number of the system, the serial number of the main memory unit 19, or even an Ethernet MAC address if one was present.

Figure 6:
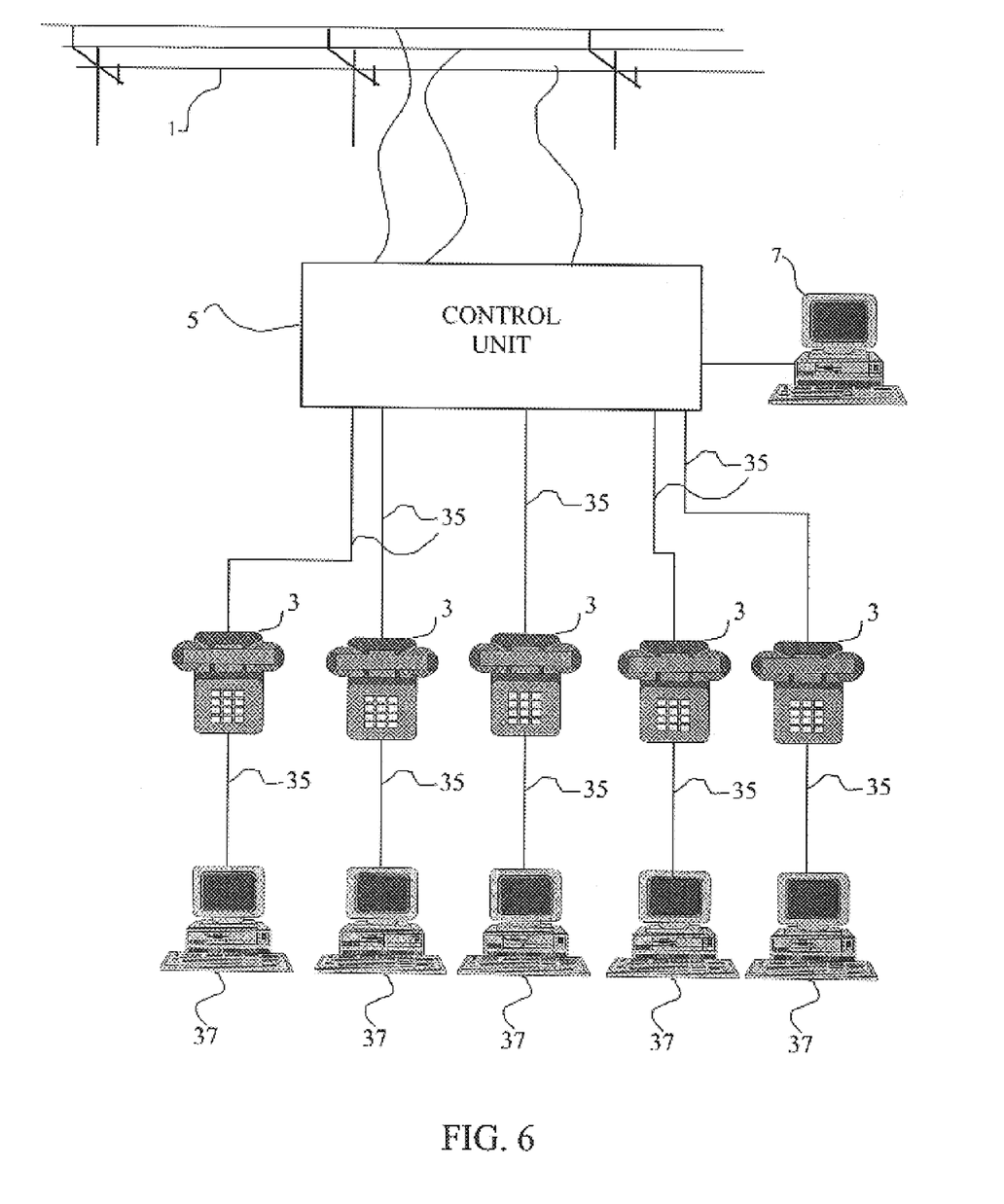
FIG. 6 is an overall schematic view of a telephone system incorporated into a computer network.

The present invention is also very beneficial in a telephone system and computer network combination as shown in FIG. 6. In such a system, the local telephones 3 share the same wires 35 with local workstations 37. This combination of telephone system and computer network is described in U.S. patent application Ser. No. 09/203,542.

While specific embodiments of the invention have been shown and described in detail to illustrate the application of the principles of the invention, it will be understood that the invention may be embodied otherwise without departing from such principles.

What is claimed is:

1. A programmable telephone system comprising:
   a plurality of phones;
   control unit connected to said plurality of phones, said control unit being connectable to an external telephone system, said control unit controlling how each of said plurality of phones communicate with each other and also communicate with the external telephone system;
   system software arranged in said control unit, said system software including instructions for operating said control unit to control how said each of said plurality of phones communicate with each other and also communicate with the external telephone system, said system software requiring license information to operate;
   a system board arranged in said control unit, said system board executing said instructions of said system software;
   a system specific memory arranged in said control unit, said system specific memory storing said license information, said system specific memory being separately replaceable from said system board in said control unit, wherein:
   said control unit includes a plurality of components divided into different physical modules, said system board being arranged in a first of said modules and said system specific memory being arranged in a second of said modules, said first and second modules being separate from each other and separately replaceable in said control unit.

2. A programmable telephone system in accordance with claim 1, wherein:
said control unit includes a chassis for receiving said system board and said system specific memory, both said system board and said system specific memory being separately receivable in said chassis, said system board and said system specific memory being physically connected through said chassis.

3. A programmable telephone system in accordance with claim 2, wherein:
said system hardware includes a main memory unit, said system specific memory is included in said main memory unit;
said chassis defines a plurality of receiving slots, one of said receiving slots receiving said main memory unit.

4. A programmable telephone system in accordance with claim 3, wherein:
said main memory unit includes a disk drive separate from said system specific memory.

5. A programmable telephone system in accordance with claim 1, wherein:
said system specific memory includes a removable media.

6. A programmable telephone system in accordance with claim 1, wherein:
said second of said modules with said system specific memory has a higher reliability and a larger Mean Time Between Failures (MTBF) than a MTBF of said module with said system board.

7. A programmable telephone system in accordance with claim 1, wherein:
individual said modules have a module connection to other said modules, and said components having a component connection to each other, said module connection being easier to connect and disconnect than said component connection.

8. A programmable telephone system in accordance with claim 1, wherein:
said modules are designed as field replaceable units and individual said components in said modules are designed as factory replaceable units, said factory replaceable units being more difficult to replace than said field replaceable units;
said system hardware includes a power supply, a local branch network interface and an external telephone complex interface, said power supply and said interface being divided into said modules.

9. A programmable telephone system in accordance with claim 1, wherein:
said system board includes a socket for receiving said system specific memory;
said system specific memory is a plug unit which plugs into said socket of said system board, said socket clamps onto said plug unit.

10. A programmable telephone system in accordance with claim 9, wherein:
said system specific memory is a non-volatile memory;
said system software is able to read and write to said system specific memory.

11. A programmable telephone system in accordance with claim 1, wherein:
said license information includes a unique system number and an encryption code;

said encryption code is specific to said unique system number, said encryption code selectively enables a plurality of options in said system software.

12. A telephone system in accordance with claim 1, wherein:
the external telephone system is a Public Switched Telephone Network (PSTN).

13. A telephone system in accordance with claim 1, wherein:
a plurality of computer workstations are also connected to said control unit;
said control unit connects said plurality of computer workstations in a computer network.

14. A telephone system in accordance with claim 1, further comprising:
a system workstation connected to said control unit, said system workstation programming said control unit and monitoring a status of said control unit.

15. A method for operating a telephone system, the method comprising the steps of:
providing a plurality of modules, each of said modules being connected to each other and cooperating with each other to operate the telephone system, one of said modules including a non-volatile memory and another of said modules being a system board, said non-volatile memory and said system board being separately replaceable in the telephone system;
controlling and operating said plurality of modules with control software in said system board, said control software requiring license information to operate;
initializing said control software including first reading said non-volatile memory for said license information,
upon failure to find said license information in said non-volatile memory, said control software requesting said license information from an external source external to the telephone system,
upon receiving said license information from said external source, said control software storing said license information in said non-volatile memory, wherein:
said non-volatile memory is in a main memory unit; and
said system board is a circuit board distinct from said main memory unit.

16. The method in accordance with claim 15, wherein:
said non-volatile memory has a higher average reliability than said system board.

17. The method in accordance with claim 15, further comprising:
providing a plurality of phones;
providing a control unit connected to said plurality of phones, said control unit being connectable to an external telephone system, said control unit including said system board;
said controlling including controlling how each of said plurality of phones communicate with each other and also communicate with the external telephone system through said control unit, said controlling being performed with said control software executed by said system board, said control software requiring said license information to operate.

18. A method for operating a telephone system, the method comprising the steps of:

providing a plurality of phones;

providing a control unit connected to said plurality of phones, said control unit being connectable to an external telephone system, said control unit including a system board, controlling how each of said plurality of phones communicate with each other and also communicate with the external telephone system through said control unit, said controlling being performed with control software executed by said system board, said control software requiring license information to operate;

providing a non-volatile memory connected to said control unit, said non-volatile memory being se rely replaceable from said system board in said control unit;

initializing said control software including first reading said non-volatile memory for said license information, upon failure to find said license information in said non-volatile memory, said control software requesting said license information from an external source external to the telephone system, upon receiving said license information from said external source, said control software storing said license information in said non-volatile memory.

* * * * *